March 20, 1962 G. V. W. ROTH ETAL 3,025,871
OPERATING VALVE AND PISTON
Filed Oct. 18, 1957 2 Sheets-Sheet 1

INVENTORS.
Grant V. W. Roth and Frank E. Saari
BY Parker & Carter
Attorneys.

March 20, 1962 G. V. W. ROTH ETAL 3,025,871
OPERATING VALVE AND PISTON
Filed Oct. 18, 1957 2 Sheets-Sheet 2

INVENTOR.
Grant V. W. Roth and Frank E. Saari,
BY Parker & Carter,
Attorneys.

United States Patent Office 3,025,871
Patented Mar. 20, 1962

3,025,871
OPERATING VALVE AND PISTON
Grant V. W. Roth, Evanston, and Frank E. Saari, Oak Park, Ill., assignors to Monarch Equipment Co., Chicago, Ill., a corporation of Illinois
Filed Oct. 18, 1957, Ser. No. 691,089
3 Claims. (Cl. 137—238)

This invention relates to an operating valve and has particular relation to a valve operable in connection with a sanding mechanism such as that applied in the railroad industry, for example.

One purpose of the invention is to provide a valve having a single moving part effective to control the passage of air through a valve housing.

Another purpose is to provide a valve piston effective in one position to provide a positive seal against unwanted passage of air through a preselected orifice.

Another purpose is to provide a valve having a replaceable seal and piston element.

Another purpose is to provide a valve having elements effective to perform a dual function.

Another purpose is to provide a valve piston of a particular design effective to serve as a piston and as a positive seal.

Another purpose is to provide a valve piston and seat therefor effective to provide a clear passage in one position of the piston and a positive seal in another position of the piston.

Other purposes will appear from time to time during the course of the specification and claims.

Figure 1:
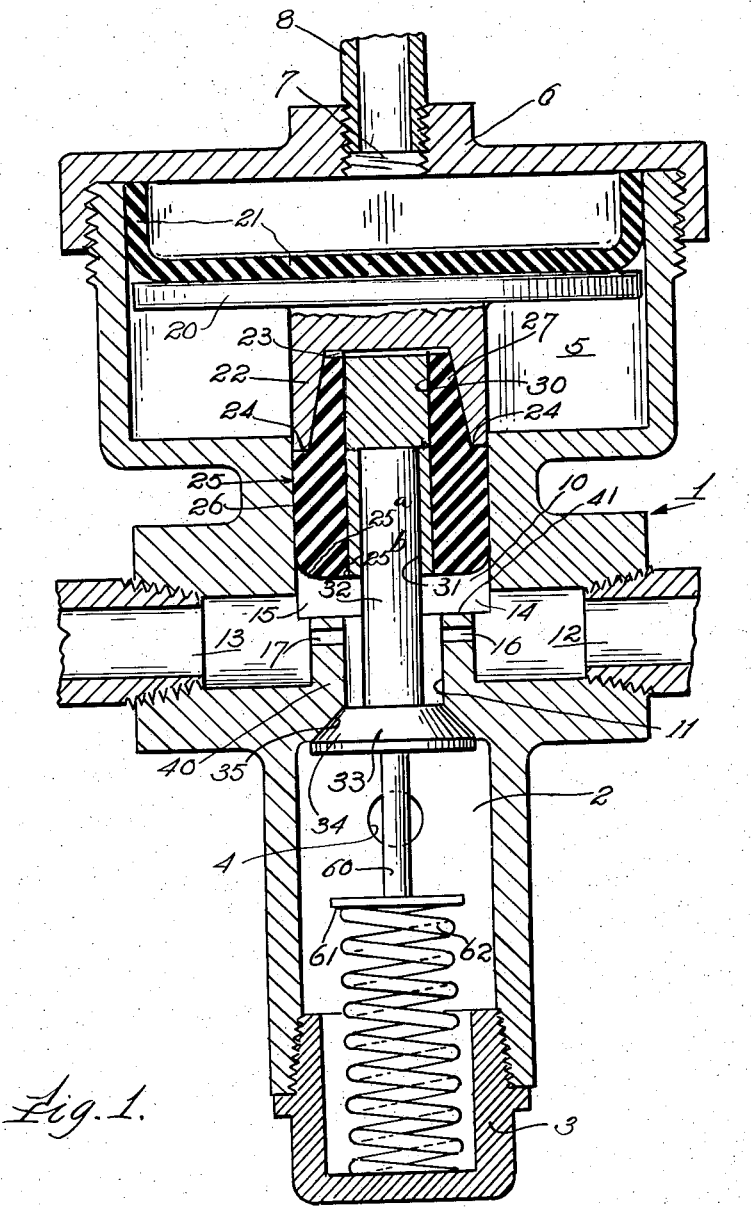
Figure 2:
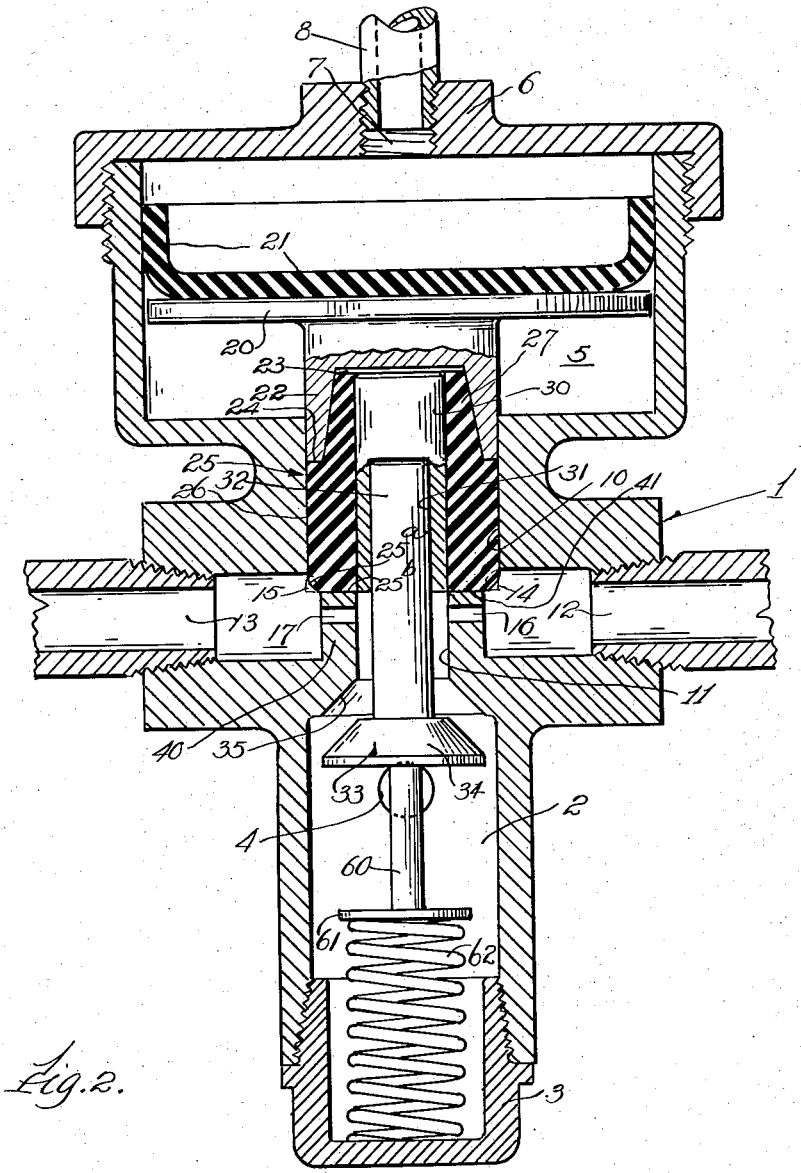

We illustrate our invention more or less diagrammatically in the accompanying drawings wherein:

FIGURE 1 is a side elevation in partial cross-section;
FIGURE 2 is a view in partial cross-section illustrating parts in another position.

Like parts are indicated by like numerals throughout the specification and drawings.

Referring now to the drawings and particularly to FIGURE 1, we illustrate a valve housing generally by the numeral 1. The housing 1 has a lower downwardly open chamber 2, closed by an escape 3. An air inlet in the wall of chamber 2 is illustrated at 4. A valve head chamber 5 is formed at the upper end, as the parts are shown in the drawings, of the housing 1. An end cap 6 is secured to the upper end of the housing 1 and closes the chamber 5 except for an air inlet opening 7 through which an air supply pipe shown partially at 8 is threadably inserted.

Between the chambers 2 and 5, the housing 1 has a passage 10 and a reduced passage 11 in axial alignment therewith, the passages 10, 11, in the absence of the elements described below, serving to place the chambers 2, 5 in communication one with the other. A plurality of outlets 12, 13 are formed in the wall of the housing 1 and each such outlet communicates with the passage 10, 11 through outlet orifices 14, 15. A pair of orifices 16, 17 of substantially reduced diameter place the outlets 12, 13 in communication with the passage 11. A piston head 20 is positioned for reciprocation in the chamber 5 and carries along its upper surface a wiper or seal ring 21. Projecting downwardly, as the parts are shown in the drawings, from the head 20 and centrally thereof, is a piston shank 22 having a generally frusto-conical upwardly directed well 23 therein. The well 23 has an annular lower face 24 surrounding the open end of the well 23.

Forming a continuation of the piston shank 22 is a valve head and seal element 25, formed of material having the properties, for example, of rubber. The element 25 has a lower cylindrical or annular portion 26 and an upper, generally frusto-conical tapering portion 27 formed and adapted to seat snugly within the well 23 of the piston shank 22. The member 25 is centrally apertured throughout its length to receive a plug 30 snugly therewithin. The plug 30 may, for example, be adhesively secured within the member 25. The plug 30 has a downwardly open central well 31 formed and adapted to receive the upper end of a valve stem 32. The valve stem 32 extends downwardly through the passage 11 and carries at its lower end a second valve head 33, substantially reduced in size in relation to the head 20. The valve head 33 has a conical upper surface 34 arranged to seat upon an inwardly inclined valve seat surface 35 formed in the innner wall of the housing 1 at the lower end of the passage 11. It will be observed that the housing wall portion 40 which serves to define the passage or channel or chamber 11 has an upper generally horizontal, as the parts are shown in the drawings, annular surface 41. It will further be observed that the outlet orifices 14, 15 are positioned immediately adjacent and in fact have their lower edges defined by the surface 41 of the wall or chamber defining portion 40. Similarly, the orifices 14, 15 are formed immediately adjacent and in fact have their upper edges defined by the upper edges of the outlets 12, 13. Thus, as shown in the dotted lines of FIGURE 2, the member 25, when at its lowermost position, seats upon the annular surface 41 and has portions of its curved lower corner edge 25a positioned within the orifice 14, 15.

As best seen in FIGURE 1, a stem portion 60 extends downwardly from the valve head 33 in the chamber 2 and carries a spring retainer member 61 against which a spring 62 is directed, the opposite end of the coiled spring 62 being positioned against the bottom wall of the cap 3.

Whereas I have described and claimed a practical and operative device, nevertheless many changes may be made in size, shape, number and disposition of parts without departing from the spirit of my invention. I therefore wish my description and drawings to be taken as, in a broad sense, illustrative or diagrammatic, rather than as limiting me to my precise showing.

The use and operation of our invention are as follows:

The spring 62 is effective to retain the valve head 33 on its seat 35. Thus air admitted into the chamber 2 through inlet 4 is retained in chamber 2 under normal circumstances. When the operator causes air under pressure to enter chamber 5 through inlet 7 from pipe 8, the air pressure over the larger head 20 is effective to cause movement of the valve member formed of elements 20, 25, 32, 33 downwardly as the parts are shown in the drawings or toward the chamber 2, thus unseating the valve-head 33 and permitting air to pass into and through chamber 11 and initially from thence through orifices 14, 15 to be discharged from the housing 1 through outlets 12, 13. In a sanding mechanism, for example, the above described operation produces a blast of clean-out air delivered from the outlets 12, 13 to the sanding mechanism.

Continued downward movement of the valve member composed of elements 20, 25, 32, 33 results in the seating of the member 25 upon its seat 41, thus precluding and sealing off the flow of air through the larger orifices 14, 15 which flow of air is shown in dotted lines in FIGURE 2. With the seating of member 25 on its seat 41, however, the valve head 33 is still off its seat 35 and air is continuing to be delivered from chamber 2 into chamber or passage 11 about the stem 32 and reduced orifices 16, 17 remain open for delivery of air to outlets 12, 13. In a sanding mechanism, for example, this reduced flow of air is employable in connection with the actual sanding operation.

Since the flow of "sanding air" above described must be controlled and the sealing of the "clean-out" air orifices 14, 15 must be complete, we find the structure to be fully effective. The elongated annular portion 26 of the member 25 provides a smooth piston-like engagement with the walls of the passage 10 and upon the seating of the portion 26 upon its seat 41, it will be realized that the pressure continuing upon the head 20 is effective to provide not only a tight sealing engagement of the lower annular surface 25b on the portion 26 with the seat 41, but to cause a "side-sealing" as a result of the lateral expansion of the segment 26 in response to the pressure exerted thereagainst by the annular surface 24. This lateral expansion, for example, causes the flexible compressed material of the element 25 to expand against and partially into the orifices 14, 15.

The center core or plug 30, which may be secured, for example, by molding in the rubber skirt or element 25 is a separate piece formed and adapted to receive the stem 32 held therein by the spring 62. Thus the stem 32 may be adequately aligned as a result of the flexibility of the element 25 which surrounds the stem-receiving well 31 permitting substantial alternate adjustment even in the presence of variation between the dimensions and conditions of the passage 10, shank 22 or head 20.

Similarly, since the member formed of elements 25, 30 is separate and therefore replaceable, a new valve guide and a new rubber or compressible material valve element is automatically supplied when this part is replaced from time to time.

We claim:

1. In a valve for sanders and the like, a housing having a first chamber therein, said housing having a second chamber in communication with said first chamber, said housing having a third chamber in communication with said second chamber and a fourth chamber in communication with said third chamber, a multi-headed valve member reciprocal within said housing, said valve member having a piston reciprocal within said first chamber, a first valve head movable with said piston for reciprocation within said second chamber, said first valve head including a metal portion and a removable end portion formed of compressible material, said valve head portions each having an outer diameter such as to cause sliding contact with the inner wall of said second chamber, a stem movable with said first valve head and extending through said third chamber, said stem having a diameter less than the diameter of said third chamber, a second valve head at the lower portion of said stem, a first valve seat formed in said fourth chamber at the juncture of said fourth and third chambers, a second valve seat formed and positioned at the juncture of said second and third chambers, an air inlet into said fourth chamber, said housing having a plurality of air outlets each including a large orifice communicating with said second chamber and a reduced orifice communicating with said third chamber, yielding means in said fourth chamber biasing said second valve head towards said first valve seat to seal off communication between said air inlet and said air outlets, an air inlet in said first chamber adjacent said piston, air under pressure admitted to said first chamber through said last mentioned air inlet adapted to bias said piston towards said second chamber and move said compressible end portion into sealing relationship on said second valve seat, said metal portion being effective to exert end-wise pressure against said end portion when said end portion is seated in sealing relationship to cause lateral extenson of said end porton against the walls of said second chamber to seal the same and close said large orifices, said second valve head simultaneously adapted to move away from said first valve seat to open communication between said first mentioned air inlet and said air outlets.

2. In a valve, a housing having a first chamber therein, said housing having a second chamber communicating with said first chamber, an annular wall at the junction between said first and second chambers, said housing having a plurality of orifices communicating with said first chamber adjacent said annular wall, said annular wall and said second chamber wall defining a plurality of orifices communicating with said second chamber, a valve member having a valve head reciprocal within said second chamber, said valve head comprising a metal portion and an end portion formed of compressible material, said end portion having a lower peripheral edge which is arcuate in cross section, said portions each having an outer diameter such as to cause sliding contact with the wall of said second chamber, said annular wall forming a seat for sad valve head, said metal portion being effective to exert edge-wise pressure against said end portion when said valve is seated to cause lateral extension of said end portion against said chamber wall whereby said orifices communicating with said second chamber are sealed.

3. In a valve, a housing having a first chamber therein, said housing having a second chamber communicating with said first chamber, an annular wall at the junction between said first and second chambers, said housing having a plurality of orifices communicating with said first chamber adjacent said annular wall, said annular wall and said second chamber wall defining a plurality of orifices communicting with said second chamber, a valve member having a valve head reciprocal within said second chamber, said valve head comprising a metal portion and an end portion formed of compressible material, said metal portion having a frusto-conic well therein and an annular end surface surrounding the open end of said well, said compressible end portion having an outer diameter generally equal to the outer diameter of said metal portion and having a frusto-conic segment seated within said well, said end portion having an annular surface adjacent said frusto-conic segment and seated upon the annular end surface surrounding said well, the outer diameters of said portions being such as to cause sliding contact with the wall of said second chamber, said annular wall forming a seat for said valve head, said metal portion being effective to exert edge-wise pressure against said end portion when said valve is seated to cause lateral extension of said end portion against said second chamber wall whereby said orifices communicating with said second chamber are sealed.

References Cited in the file of this patent

UNITED STATES PATENTS

| 1,004,845 | Bohme | Oct. 3, 1911 |
| 1,983,163 | Buckman | Dec. 4, 1934 |
| 2,217,959 | Long | Oct. 15, 1940 |
| 2,589,794 | Frantz | Mar. 18, 1952 |
| 2,763,282 | Reedy et al. | Sept. 18, 1956 |

FOREIGN PATENTS

| 186,225 | Great Britain | of 1922 |
| 362,953 | Great Britain | of 1931 |